No. 699,477. Patented May 6, 1902.
W. E. BEE.
CONVEYER BELT ROLLER.
(Application filed May 11, 1901.)
(No Model.) 2 Sheets—Sheet 1.
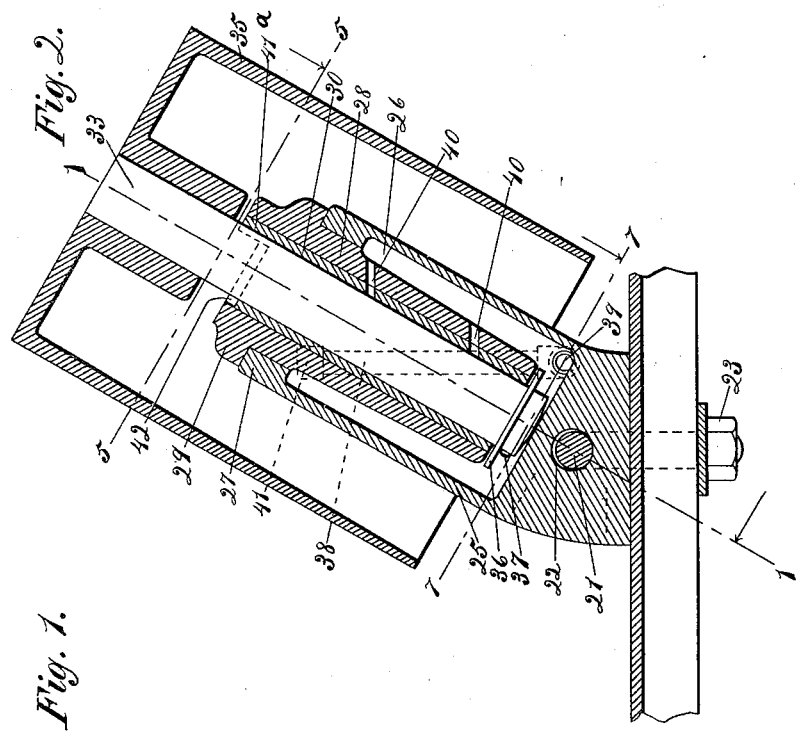
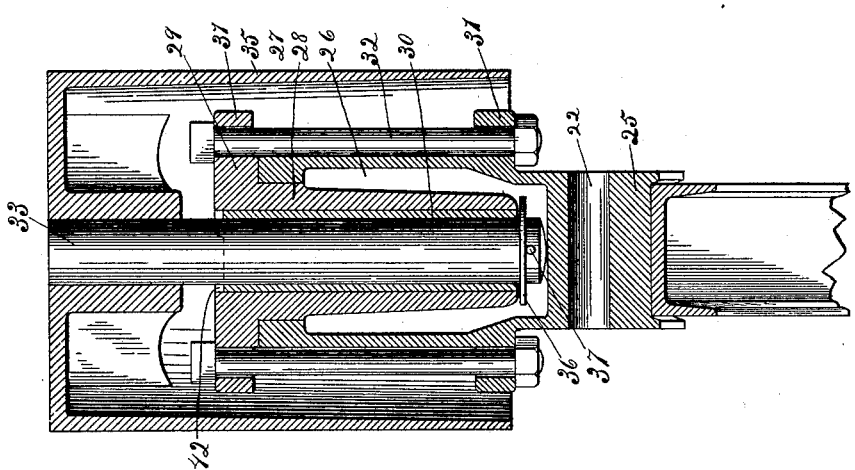
WITNESSES: INVENTOR
William E. Bee
BY
ATTORNEY.

No. 699,477. Patented May 6, 1902.
W. E. BEE.
CONVEYER BELT ROLLER.
(Application filed May 11, 1901.)
(No Model.) 2 Sheets—Sheet 2.

WITNESSES:
Arthur B. Seibold.
2V. H. Cotton.

INVENTOR.
William E. Bee
BY
Louis K. Gibson
ATTORNEY.

THE NORRIS PETERS CO., PHOTO-LITHO., WASHINGTON, D. C.

UNITED STATES PATENT OFFICE.

WILLIAM E. BEE, OF AURORA, ILLINOIS, ASSIGNOR TO FIRM OF STEPHENS, ADAMSON & CO., CONSISTING OF WILLIAM E. BEE, WILEY W. STEPHENS, AND FREDERICK G. ADAMSON, OF AURORA, ILLINOIS.

CONVEYER-BELT ROLLER.

SPECIFICATION forming part of Letters Patent No. 699,477, dated May 6, 1902.

Application filed May 11, 1901. Serial No. 59,886. (No model.)

*To all whom it may concern:*

Be it known that I, WILLIAM E. BEE, a citizen of the United States, and a resident of Aurora, county of Kane, and State of Illinois, have invented certain new and useful Improvements in Conveyer-Belt Rollers, of which the following is a specification, and which are illustrated in the accompanying drawings, forming a part thereof.

My invention relates particularly to improvements in the concentrating-rollers employed with conveyer-belts. Such rollers are arranged in pairs at opposite edges of the upper stretch of the belt, and principally at the loading-points, and are relied upon for concentrating or "troughing" the belt when used for conveying grain, coal, ore, and similar substances in order to increase the carrying capacity thereof and also to prevent the spilling or overflowing of the material from the belt. Owing to the weight on these rollers and the speed at which they are caused to rotate by the belt, constant lubrication is needed; and my invention has for one of its objects to provide means for securing such lubrication in a thorough and efficient manner.

It consists also in certain details of construction, as hereinafter set forth.

The invention is illustrated in the accompanying drawings, in which—

Figure 5:
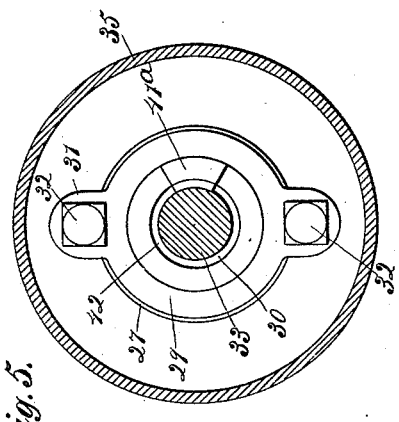
Figure 7:
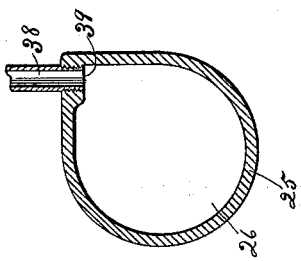
Figure 6:
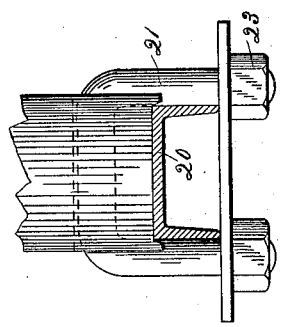
Figure 3:
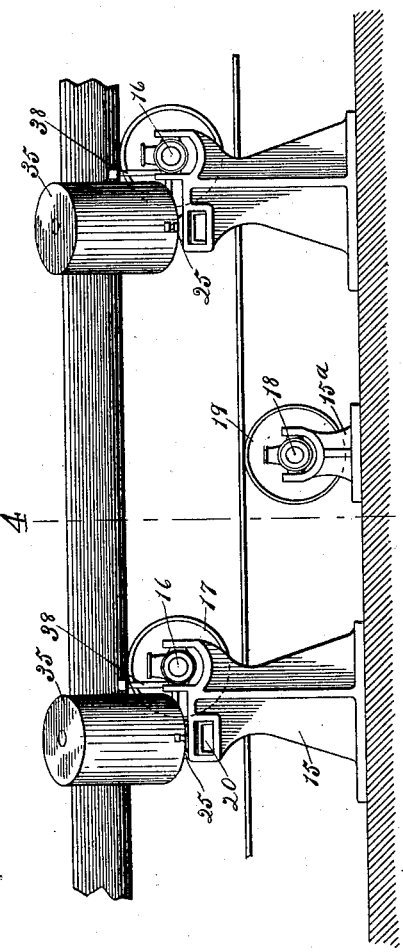
Figure 4:
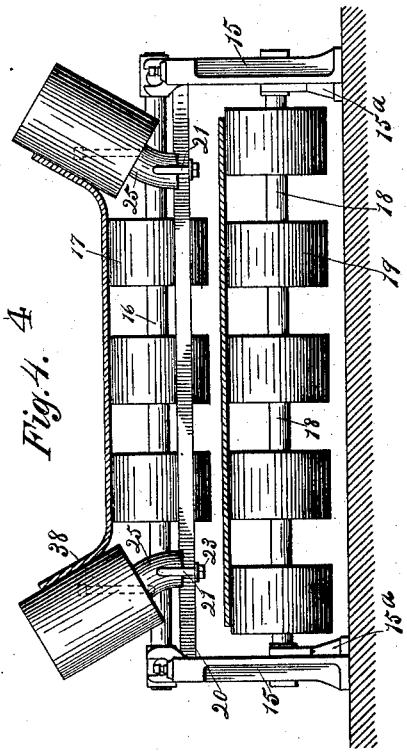

Figure 1 is a section on the line 1 1 of Fig. 2 looking in the direction of the arrow. Fig. 2 is a vertical section of one of the concentrating-rollers. Fig. 3 is a side elevation of a section of a belt conveyer, illustrating the use of the concentrating-rollers. Fig. 4 is a section on the line 4 4 of Fig. 3. Fig. 5 is a section on the line 5 5 of Fig. 2. Figs. 6 and 7 relate to details of construction.

In order to more fully illustrate the character of my invention and the nature of its employment, I have shown in Figs. 3 and 4 a section of a belt conveyer and the mechanism used with the same. In these figures, 15 and 15ᵃ designate the floor-standards, in which are respectively journaled the shafts for the belt-carrying pulleys and the return-idlers and which are arranged in pairs and at the opposite sides of the conveyer-belt. The shafts 16 for the belt-carrying pulleys 17 are located at the upper end of the pairs of standards 15, and the return-idlers 19 are mounted on shafts 18, journaled on the standards 15ᵃ. Supported by each pair of the standards 15 is a cross bar or beam 20, to which are adjustably secured, in order to vary the concentration or troughing of the belt, by means of U-shaped bolts 21, passing through transverse apertures 22, and nuts 23, a pair of angle-brackets 25.

The mechanism thus far described is of a well-known order, except that in the ordinary construction instead of the brackets, such as I have shown and described, inclined spindles or shafts are employed, on which the concentrating-rollers are journaled.

In carrying out my invention the end of each of the brackets 25 is chambered, as at 26, an internal flange 27 being provided at the open end. Extending into the chambered end of the bracket 25 and to near the bottom thereof is a bushing or bearing-sleeve 28, the upper end of which has an external collar 29, adapted to rest upon the flange 27 of the bracket 25 for supporting the bushing in the chamber 26. The bushing 28 has a lining 30, of Babbitt metal, and it, as well as the bracket 25, is provided with apertured lugs 31, by means of which and bolts 32 the bushing is secured to the bracket. The concentrating-roller 35 is secured to a spindle 33, which rotates in the Babbitt-lined bushing 28, and the end of this spindle passes through the bushing 28 and rests upon the inclined bottom of the chamber in the bracket 25, being rounded in order that it may operate with the least possible friction. A collar 36, retained by a pin 37, at the end of the spindle prevents the withdrawal of the same from the bushing during rotation. The chamber 26, formed between the inner wall of the bracket 25 and the outer wall of the bushing 28, is supplied with oil by a pipe 38, entering, as at 39, into the chamber. Passages 40, extending through the bushing and its lining, conduct the oil from the chamber 26 to the inner face of the bushing and the spindle, and in addition, the lower end of the bushing 28 being entirely surrounded by the lubricant, the oil will also work into the bearing from the bottom. The outer end of the pipe 38 is closed by a cap 41, which is removed when it is desired to renew the supply of oil in the chamber 26.

In order to prevent the waste of the oil by reason of its being carried by the spindle 33 beyond the upper end of the bearing and running down the side of the bracket, the bushing 28 is provided with a beveled extension 41$^a$ at its upper end, which bears against and is designed to scrape from the spindle any oil adhering thereto and carried thereby above the upper end of the bushing, returning such oil to the channel 42, formed by cutting away the Babbitt lining 30 at the upper end of the bushing 27.

In assembling the parts the spindle 33 is first passed through the bushing 28 and the collar 36 secured to the projecting end thereof by the pin 37. The spindle and the attached bushing 28 are then dropped into the chamber 26 of the angle-bracket 25 and the bushing secured to the bracket by the bolts 32.

The feed-pipe 38, extending above the passages 40, leading from the oil-chamber 26 to the working face of the spindle 33, will provide a sufficient head of oil for keeping the parts well lubricated, and the extension 41$^a$ preventing the escape of oil, thereby avoiding the waste thereof, it will be necessary to renew the supply of oil only at long intervals.

I claim as my invention—

1. In a concentrator for conveyer-belts, in combination, an upwardly-extending bracket apertured from its upper end, a bushing fitting in the aperture and spaced from the side wall thereof, a spindle journaled in the bushing, the bushing having passages leading from the space surrounding the same to the spindle, and a roller fixed upon the outer end of the spindle and extending downwardly over the bracket.

2. In a concentrator for conveyer-belts, in combination, an upwardly and outwardly inclined bracket apertured from its upper end, a bushing fitting in but not filling such aperture, a spindle journaled in the bushing and resting upon the bottom of the aperture, and a roller fixed upon the outer end of the spindle and extending downwardly over the bracket.

3. In a concentrator for conveyer-belts, in combination, an upwardly and outwardly inclined bracket apertured from its upper end, a bushing fitting in but not filling such aperture, a spindle journaled in the bushing and resting upon the bottom of the aperture, a roller fixed upon the outer end of the spindle and extending downwardly over the bracket, and a scraper integral with the bushing for removing from the spindle and returning to the bearing the oil carried out of the bushing.

WILLIAM E. BEE.

Witnesses:
LOUIS K. GILLSON,
E. M. KLATCHER.